US012615414B2

(12) United States Patent
Sun

(10) Patent No.: US 12,615,414 B2
(45) Date of Patent: Apr. 28, 2026

(54) ACCESS DETECTION METHOD, SYSTEM, AND APPARATUS

(71) Applicant: SHANGHAI BILIBILI TECHNOLOGY CO., LTD., Shanghai (CN)

(72) Inventor: Yuanyuan Sun, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 47 days.

(21) Appl. No.: 18/694,844

(22) PCT Filed: Jun. 17, 2022

(86) PCT No.: PCT/CN2022/099473
§ 371 (c)(1),
(2) Date: Mar. 22, 2024

(87) PCT Pub. No.: WO2023/045434
PCT Pub. Date: Mar. 30, 2023

(65) Prior Publication Data
US 2024/0397145 A1 Nov. 28, 2024

(30) Foreign Application Priority Data

Sep. 23, 2021 (CN) .......................... 202111117081.X

(51) Int. Cl.
*H04N 21/442* (2011.01)
*H04N 21/2187* (2011.01)
(52) U.S. Cl.
CPC ... *H04N 21/44213* (2013.01); *H04N 21/2187* (2013.01)
(58) Field of Classification Search
None
See application file for complete search history.

(56) References Cited

U.S. PATENT DOCUMENTS 8,079,054 B1 * 12/2011 Dhawan ............... H04N 21/812
705/14.6
8,615,514 B1 * 12/2013 Fernandes ............. G06F 16/958
707/728
(Continued)

FOREIGN PATENT DOCUMENTS

CN 106612216 A 5/2017
CN 106909545 A 6/2017
(Continued)

OTHER PUBLICATIONS

International Patent Application No. PCT/CN2022/099473; Int'l Search Report; dated Sep. 9, 2022; 3 pages.

*Primary Examiner* — An Son P Huynh
(74) *Attorney, Agent, or Firm* — BakerHostetler

(57) ABSTRACT

This application provides an access detection method, system, and apparatus. The access detection method includes: obtaining user attribution information of a target object in a predetermined duration of time; determining attribution types of the user attribution information, determining a distribution of users accessing the target object and a distribution of users with freezing reporting about the target object in the predetermined duration of time based on the attribution types and the user attribution information; calculating a distribution of freezing rates in the predetermined duration of time based on the distribution of users accessing the target object and the distribution of users with freezing reporting about the target object; and determining an access detection result of the target object based on the distribution of freezing rates. In this way, whether abnormal access exists in the target object is detected in a manner of analyzing freezing rates, thereby effectively improving detection precision.

20 Claims, 5 Drawing Sheets

(56) References Cited

U.S. PATENT DOCUMENTS

| | | | | |
|---|---|---|---|---|
| 8,745,647 | B1* | 6/2014 | Shin | H04N 21/442 |
| | | | | 725/9 |
| 10,061,916 | B1* | 8/2018 | Jiang | G06F 21/316 |
| 10,296,936 | B1* | 5/2019 | Saurabh | G06Q 30/0242 |
| 11,082,467 | B1* | 8/2021 | Hartnett | H04L 65/403 |
| 11,190,840 | B2* | 11/2021 | Kumar | H04N 21/4542 |
| 11,265,602 | B2* | 3/2022 | Malhotra | H04N 21/44204 |
| 11,553,228 | B2* | 1/2023 | Zito, Jr. | H04N 21/2668 |
| 2002/0056087 | A1* | 5/2002 | Berezowski | H04N 21/488 |
| | | | | 348/E7.071 |
| 2005/0149964 | A1* | 7/2005 | Thomas | H04N 21/442 |
| | | | | 348/E7.071 |
| 2007/0136753 | A1* | 6/2007 | Bovenschulte | H04N 7/17318 |
| | | | | 348/E7.071 |
| 2011/0279311 | A1* | 11/2011 | Hamano | G06F 16/9535 |
| | | | | 707/769 |
| 2012/0254911 | A1* | 10/2012 | Doe | H04N 21/4104 |
| | | | | 725/14 |
| 2013/0297638 | A1* | 11/2013 | Hein | G06F 16/78 |
| | | | | 707/758 |
| 2014/0026051 | A1* | 1/2014 | Roh | G06F 16/743 |
| | | | | 715/720 |
| 2014/0068692 | A1* | 3/2014 | Archibong | H04N 21/4334 |
| | | | | 725/116 |
| 2014/0081954 | A1* | 3/2014 | Elizarov | G06F 16/9536 |
| | | | | 707/722 |
| 2014/0372850 | A1* | 12/2014 | Campbell | G06F 40/18 |
| | | | | 715/212 |
| 2015/0149091 | A1* | 5/2015 | Milton | H04W 4/029 |
| | | | | 702/2 |
| 2015/0350729 | A1* | 12/2015 | Reynolds | H04N 21/4325 |
| | | | | 725/34 |
| 2016/0149956 | A1* | 5/2016 | Birnbaum | H04L 63/101 |
| | | | | 726/1 |
| 2017/0048184 | A1* | 2/2017 | Lewis | G06Q 30/0631 |
| 2017/0127104 | A1* | 5/2017 | Thomas | H04N 21/2407 |
| 2017/0161772 | A1* | 6/2017 | Xu | G06F 16/2455 |
| 2018/0027298 | A1* | 1/2018 | Paglia | H04N 21/234 |
| | | | | 725/37 |
| 2018/0098122 | A1* | 4/2018 | Cho | H04N 21/44204 |
| 2018/0152760 | A1* | 5/2018 | Venetucci | H04N 21/251 |
| 2018/0253755 | A1* | 9/2018 | Cheng | G06F 15/76 |
| 2018/0262452 | A1* | 9/2018 | Guthery | G06Q 30/0601 |
| 2018/0288490 | A1* | 10/2018 | Thomas | H04N 21/8133 |
| 2019/0026274 | A1* | 1/2019 | Deng | G06N 3/045 |
| 2019/0052939 | A1* | 2/2019 | Wang | H04N 21/4826 |
| 2019/0320223 | A1* | 10/2019 | Malhotra | H04N 21/812 |
| 2020/0236123 | A1 | 7/2020 | Kessel et al. | |
| 2021/0034668 | A1* | 2/2021 | Chen | G06F 16/738 |
| 2021/0035559 | A1* | 2/2021 | Xu | G10L 15/063 |
| 2021/0195286 | A1* | 6/2021 | Lohumi | G06V 10/82 |
| 2021/0303622 | A1* | 9/2021 | Voss | G06F 16/7867 |
| 2022/0020045 | A1* | 1/2022 | Guney | G06F 3/04817 |
| 2022/0060786 | A1* | 2/2022 | Kumar | H04N 21/44008 |
| 2022/0357789 | A1* | 11/2022 | Yang | G06F 1/3234 |
| 2023/0326115 | A1* | 10/2023 | Xiao | H04N 21/431 |
| | | | | 345/473 |
| 2024/0036969 | A1* | 2/2024 | Feng | G06F 11/0778 |
| 2024/0292063 | A1* | 8/2024 | Jiang | H04N 21/437 |

FOREIGN PATENT DOCUMENTS

| | | | | |
|---|---|---|---|---|
| CN | 107819624 A | | 3/2018 | |
| CN | 110007968 A | * | 7/2019 | G06F 11/0793 |
| CN | 111092757 A | | 5/2020 | |
| CN | 112073745 A | | 12/2020 | |
| CN | 112866806 A | | 5/2021 | |
| CN | 113068052 A | | 7/2021 | |
| CN | 113094239 A | | 7/2021 | |
| CN | 113840157 A | | 12/2021 | |

* cited by examiner

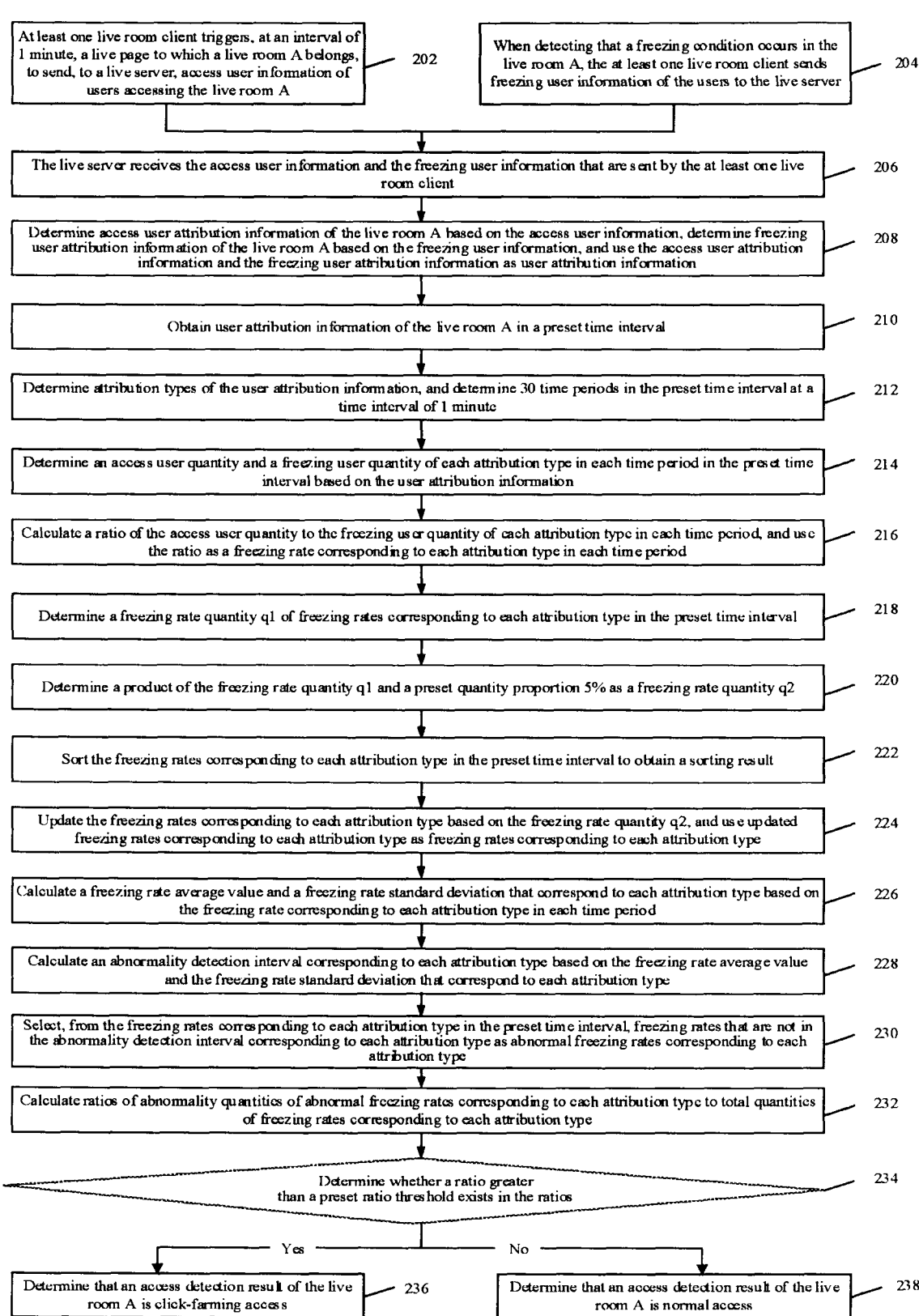

At least one live room client triggers, at an interval of 1 minute, a live page to which a live room A belongs, to send, to a live server, access user information of users accessing the live room A — 202

When detecting that a freezing condition occurs in the live room A, the at least one live room client sends freezing user information of the users to the live server — 204

The live server receives the access user information and the freezing user information that are sent by the at least one live room client — 206

Determine access user attribution information of the live room A based on the access user information, determine freezing user attribution information of the live room A based on the freezing user information, and use the access user attribution information and the freezing user attribution information as user attribution information — 208

Obtain user attribution information of the live room A in a preset time interval — 210

Determine attribution types of the user attribution information, and determine 30 time periods in the preset time interval at a time interval of 1 minute — 212

Determine an access user quantity and a freezing user quantity of each attribution type in each time period in the preset time interval based on the user attribution information — 214

Calculate a ratio of the access user quantity to the freezing user quantity of each attribution type in each time period, and use the ratio as a freezing rate corresponding to each attribution type in each time period — 216

Determine a freezing rate quantity q1 of freezing rates corresponding to each attribution type in the preset time interval — 218

Determine a product of the freezing rate quantity q1 and a preset quantity proportion 5% as a freezing rate quantity q2 — 220

Sort the freezing rates corresponding to each attribution type in the preset time interval to obtain a sorting result — 222

Update the freezing rates corresponding to each attribution type based on the freezing rate quantity q2, and use updated freezing rates corresponding to each attribution type as freezing rates corresponding to each attribution type — 224

Calculate a freezing rate average value and a freezing rate standard deviation that correspond to each attribution type based on the freezing rate corresponding to each attribution type in each time period — 226

Calculate an abnormality detection interval corresponding to each attribution type based on the freezing rate average value and the freezing rate standard deviation that correspond to each attribution type — 228

Select, from the freezing rates corresponding to each attribution type in the preset time interval, freezing rates that are not in the abnormality detection interval corresponding to each attribution type as abnormal freezing rates corresponding to each attribution type — 230

Calculate ratios of abnormality quantities of abnormal freezing rates corresponding to each attribution type to total quantities of freezing rates corresponding to each attribution type — 232

Determine whether a ratio greater than a preset ratio threshold exists in the ratios — 234

Yes          No

Determine that an access detection result of the live room A is click-farming access — 236

Determine that an access detection result of the live room A is normal access — 238

FIG. 2

ACCESS DETECTION METHOD, SYSTEM, AND APPARATUS

CROSS-REFERENCE TO RELATED APPLICATIONS

This application is the U.S. National Stage of International Application No. PCT/CN2022/099473, filed on Jun. 17, 2022, which claims priority to Chinese Patent Application No. 202111117081.X, filed on Sep. 23, 2021, and entitled "ACCESS DETECTION METHOD, SYSTEM, AND APPARATUS", which are incorporated herein by reference in their entireties.

TECHNICAL FIELD

This application relates to the field of data processing technologies, and in particular, to an access detection method. This application also relates to an access detection system, an access detection apparatus, a computing device, a computer-readable storage medium, and a computer program.

BACKGROUND

In a live system, live popularity is an important indicator used to rank live rooms of a livestreaming platform. Usually, higher live popularity indicates a higher rank of a live room, and an online streamer is more likely to be watched by a user. However, some online streamers use abnormal means to simulate access to live rooms to improve popularity. This case affects fairness of ranking of the live rooms. Therefore, precisely determining whether a click-farming condition exists in a live room and performing a specific punitive measure on a room with click-farming are of great significance to maintain ecology of a livestreaming platform. Currently, in many livestreaming platforms, whether a click-farming condition exists in a live room is determined based on a fluctuation condition of a quantity of livestreaming viewers. However, this determining manner cannot be used to precisely determine whether click-farming exists in the live room.

SUMMARY

In view of this, embodiments of this application provide an access detection method. This application also relates to an access detection system, an access detection apparatus, a computing device, a computer-readable storage medium, and a computer program, to resolve a problem in the conventional technology that whether click-farming exists in a live room cannot be precisely determined.

According to a first aspect of the embodiments of this application, an access detection method is provided, including:

obtaining user attribution information of a target object in a predetermined duration of time;

determining attribution types of the user attribution information, and determining an access user distribution, i.e., a distribution of users accessing the target object, and a freezing user distribution, i.e., a distribution of users with freezing reporting about accessing the target object, in the predetermined duration of time based on the attribution types and the user attribution information;

calculating a distribution of freezing rates in the predetermined duration of time based on the access user distribution and the freezing user distribution; and determining an access detection result of the target object based on the distribution of freezing rates.

According to a second aspect of the embodiments of this application, an access detection system is provided, including:

at least one client device and a server, where the at least one client device is configured to send, to the server device, user information for accessing a target object; and the server device is configured to: receive the user information sent by the at least one client device; determine user attribution information of the target object based on the user information; obtain user attribution information of the target object in a predetermined duration of time; determine attribution types of the user attribution information, and determine an access user distribution and a freezing user distribution in the predetermined duration of time based on the attribution types and the user attribution information; calculate a distribution of freezing rates in the predetermined duration of time based on the access user distribution and the freezing user distribution; and determine an access detection result of the target object based on the distribution of freezing rates.

According to a third aspect of the embodiments of this application, an access detection apparatus is provided, including:

an obtaining means, configured to obtain user attribution information of a target object in a predetermined duration of time;

a distribution determining means, configured to determine attribution types of the user attribution information, and determine an access user distribution and a freezing user distribution in the predetermined duration of time based on the attribution types and the user attribution information;

a calculation means, configured to calculate a distribution of freezing rates in the predetermined duration of time based on the access user distribution and the freezing user distribution; and a result determining means, configured to determine an access detection result of the target object based on the distribution of freezing rates.

According to a fourth aspect of the embodiments of this application, a computing device is provided, including a memory, a processor, and computer instructions stored in the memory and capable of running on the processor, where when the processor executes the computer instructions, the steps of the access detection method are implemented.

According to a fifth aspect of the embodiments of this application, a computer-readable storage medium is provided. The computer-readable storage medium stores computer instructions, and when the computer instructions are executed by a processor, the steps of the access detection method are implemented.

According to a sixth aspect of the embodiments of this application, a computer program is provided, and when the computer program is executed in a computer, the computer is enabled to perform the steps of the access detection method.

According to the access detection method provided in this application, the user attribution information of the target object in the predetermined duration of time is obtained to determine the attribution types of the user attribution information, and the access user distribution and the freezing user distribution in the predetermined duration of time are determined based on the attribution types and the user attribution information. In this way, statistics collection is performed on the access user distribution and the freezing user distribution of the target object based on the attribution types. In addition, with reference to the access user distribution and the freezing user distribution, the distribution of freezing rates in the predetermined duration of time is calculated, and the access detection result of the target object is determined based on the distribution of freezing rates. In this way, whether abnormal access exists in the target object is detected in a manner of analyzing freezing rates, thereby effectively improving detection precision to facilitate reasonable management performed by a downstream service on the target object in which abnormal access exists.

BRIEF DESCRIPTION OF DRAWINGS

FIG. 2 is a flowchart of processing of an access detection method applied to a livestreaming scene according to an embodiment of this application;

DESCRIPTION OF EMBODIMENTS

Figure 1:
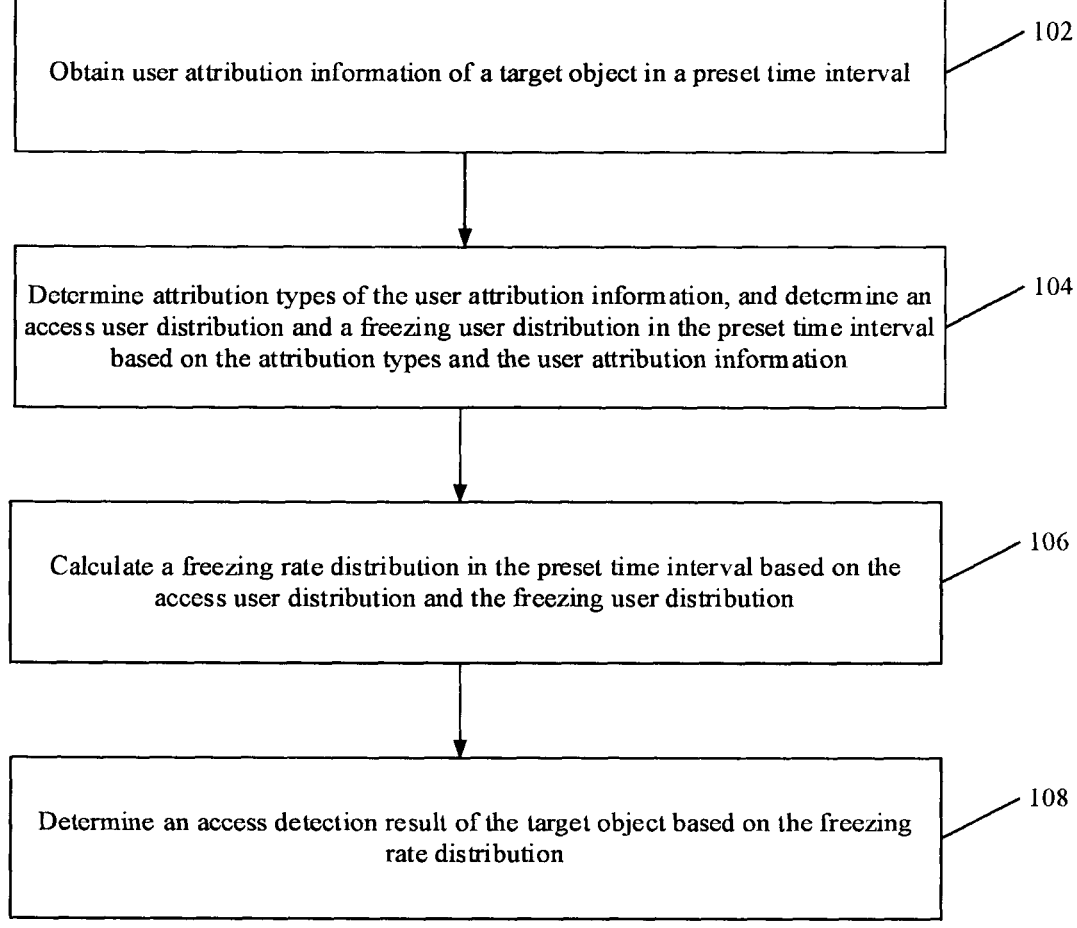
FIG. 1 is a flowchart of an access detection method according to an embodiment of this application.

Many specific details are described in the following description to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a" and "the" that are in singular forms and that are used in one or more embodiments and the appended claims of this application are also intended to include plural forms, unless otherwise specified in the context clearly. It should also be understood that, the term "and/or" used in one or more embodiments of this application indicates and includes any or all possible combinations of one or more associated listed items.

It should be understood that although the terms such as "first" and "second" may be used in one or more embodiments of this application to describe various types of information, the information should not be limited to these terms. These terms are merely used to distinguish between information of a same type. For example, without departing from the scope of the one or more embodiments of this application, "first" may also be referred to as "second", and similarly, "second" may also be referred to as "first".

Depending on the context, for example, the word "if" used herein can be interpreted as "while", "when", or "in response to determining".

Terms used in one or more embodiments of this application are explained first.

Live stream: A live stream refers to transmission of live audio/video data, which can be transmitted as a stable and continuous stream to an audience via a network for watching.

Live pulling: Live pulling refers to a process of pulling a live stream from a user-specified origin server device by using a cloud livestreaming platform.

Live popularity: Live popularity refers to a value calculated based on a specific proportion by integrating a quantity of online viewers, a quantity of bullet-screen comments, a quantity of gifts, and the like. The live popularity is used for ranking live rooms based on popularity at a livestreaming platform.

Quantity of live viewers: A quantity of live viewers is a real quantity of people watching a live room in real time.

Click-farming: Click-farming refers to a case in which a large amount of false watching is generated by simulating normal user access.

Click-farming prevention: Click-farming prevention refers to identifying an abnormal access request by using a technical means, and refusing an illegal request.

Standard deviation: A standard deviation refers to a concept of measuring a degree of dispersion of a set of values from an average value. A large standard deviation represents large differences between most values and an average value of the values. A small standard deviation represents that these values are close to the average value.

Internet protocol address (IP address): An Internet protocol address is a uniform address form provided by an IP protocol, and is used to allocate a logic address for each network and each host on the Internet, to shield a difference between physical addresses.

Global positioning system (GPS): A global positioning system is a high-precision radio navigation positioning system based on a man-made earth satellite. The global positioning system can provide an accurate geographical location, a vehicle speed, and precise time information anywhere in the world and in near-earth space.

In this application, an access detection method is provided. This application also relates to an access detection system, an access detection apparatus, a computing device, a computer-readable storage medium, and a computer program, which are described in detail one by one in the following embodiments.

FIG. 1 is a flowchart of an access detection method according to an embodiment of this application. The method specifically includes the following steps.

Step 102: Obtain user attribution information of a target object in a predetermined duration of time.

The predetermined duration of time is a time interval set in advance for performing access detection on the target object. It may also be understood as that whether abnormal access exists in the target object in this time interval is detected. The predetermined duration of time may be any time interval, and specific duration of the time interval may be 30 minutes, 45 minutes, 1 hour, or the like. This is not limited herein.

The target object is an object that can be accessed, for example, a live room, a video, a novel, and a website. This is not limited herein. Correspondingly, the user attribution information is attribution information of users accessing the target object. Specifically, the user attribution information includes a geographical location attribution, a network attribution, an age attribution, a gender attribution, an occupation attribution, and the like of access users. This is not limited herein. In actual application, the user attribution information of the target object in the predetermined duration of time is obtained, and based on a timestamp carried in the user attribution information, user attribution information of the timestamp in the predetermined duration of time is obtained.

In a specific implementation, the user attribution information may be directly sent by a client device. In this case, the timestamp carried in the user attribution information is a reception time at which a server device receives the user attribution information. In addition, the user attribution information may alternatively be obtained by performing, by the server device, information processing on received user information. In this case, the timestamp carried in the user attribution information is a reception time at which the server device receives the user information corresponding to the user attribution information.

In actual application, to avoid increasing a detection time when the user attribution information is determined based on the user information sent by the client device in a process of performing access detection on the target object, the user attribution information may be directly determined based on the received user information when the user information is received, and the determined user attribution information is stored, so that the pre-stored user attribution information is obtained when access detection is performed on the target object. In this embodiment of this application, the following manner is specifically used for implementation:

receiving user information of users accessing the target object; and determining the user attribution information of the target object based on the user information.

The user information is related information of the users accessing the target object. The user information each may include access information such as an IP address of a client device used by the user, a user account, or a phone number of the user. This is not limited herein. In actual application, a quantity of users accessing the target object may be excessively large. If the server device needs to actively collect related user information, great pressure is imposed on the server device. To reduce pressure on the server device, the client device may actively send the user information to the server device, so that the server device can determine the user attribution information based on the received user information.

For example, the user information includes a phone number of a user accessing the target object. After receiving the phone number, the server device may query, based on the phone number, information about a city in which the user holding the phone number is located, and use the information about the city as the user attribution information.

In conclusion, the user information of the users accessing the target object is received, and the user attribution information of the target object is determined based on the user information, so that the user attribution information of the user information is determined before access detection is performed on the target object, thereby improving access detection efficiency of the target object.

Further, because freezing conditions of users at a same geographical location and served by a same network operator (or a same geographical location) are similar, whether an abnormal access condition exists in the target object can be better identified by using the geographical location and the network operator (or the geographical location) as the user attribution information. In this embodiment of this application, the following manner is specifically used for implementation:

parsing the user information to obtain an address identifier; and querying location information and network information that correspond to the address identifier, and using the location information and the network information as the user attribution information of the target object; or querying location information corresponding to the address identifier, and using the location information as the user attribution information of the target object.

The address identifier may be identification information such as an IP address, a geographical address abbreviation, or geographical address details. This is not limited herein. In a specific implementation, the user information is parsed. If the user information includes the address identifier, it may be understood as that the address identifier is obtained from the user information. If the user information does not include the address identifier, the address identifier corresponding to the user information may be queried based on information included in the user information.

In a specific implementation, query may be performed based on the parsed address identifier, to obtain the location information and the network information that correspond to the address identifier, or obtain the location information corresponding to the address identifier. Specifically, query may be performed in a preset database. The location information may be information such as a province name, a province code, a city name, or a city code. The network information may be information about a network operator (for example, China Unicom, China Telecom, or China Mobile), information about a network type (for example, a 4G type, a 5G type, or a broadband type), and the like. In actual application, the location information and the network information may be combined as the user attribution information, or the location information may be directly used as the user attribution information. In a specific implementation, detection may be performed based on a detection requirement on the target object. This is not limited herein.

For example, the target object is a live room. A client device A sends, to the server device, user information infor1 of a user U accessing the live room 1, where the user information infor1 includes a live room identifier (room_id) "123" of the live room 1 and an IP address of a client device used by the user U. After receiving the user information infor1, the server device parses the user information infor1 to obtain the IP address ip1 included in the user information infor1. Query is performed in a GPS library based on ip1, to obtain a province name "Anhui" and a network operator name "China Mobile" that correspond to ip1.

In conclusion, when the user information is parsed to obtain the address identifier, the location information and the network information that correspond to the address identifier are determined, or the location information corresponding to the address identifier is determined, and the information is used as the user attribution information to perform access detection on the target object, thereby improving access detection accuracy.

Currently, whether a click-farming condition (an abnormal access condition) exists in the target object is usually determined based on a trend of a quantity of users accessing the target object. For example, if the quantity of users accessing the target object steeply increases in an instant or a quantity of access users is always the same (there is no fluctuation), it indicates that the click-farming condition may exist in the target object. However, statistics collection performed on the quantity of access users is performed based on periodic heartbeat reporting of the client device. Theoretically, if an algorithm for simulating heartbeat reporting is good enough, a same effect as real target object access is generated. Therefore, whether click-farming exists in the target object may not be accurately determined based on the trend of the quantity of users accessing the target object. To improve determining precision, freezing reporting may be combined with heartbeat reporting of the client device, and a distribution rule of the quantity of access users and a distribution rule of a quantity of freezing users are determined based on reported information, to further determine whether the target object is in line with a normal man-made access effect. In this embodiment of this application, the following manner is specifically used for implementation:

receiving access user information and freezing user information of the users accessing the target object; and using the access user information and the freezing user information as the user information.

Correspondingly, the determining the user attribution information of the target object based on the user information includes:

determining access user attribution information of the target object based on the access user information in the user information, and determining freezing user attribution information of the target object based on the freezing user information in the user information; and using the access user attribution information and the freezing user attribution information as the user attribution information.

The access user information is information about the users accessing the target object. When the client device enters a page to which the target object belongs, the information may be heartbeat information periodically sent by the page. The heartbeat information may be an HTTP request, and is used to report that one user is currently accessing the target object. The heartbeat information may include: object information of the target object and user information of the access user.

The freezing user information is information about freezing users in the access users in a process of accessing the target object. In actual application, information content included in the freezing user information may be the same as or different from content included in the access user information. This is not limited herein. Specifically, when a user watches a live room, freezing refers to a phenomenon occurring in a process of playing a live stream in the live room, for example, freezing during watching or artifact. Each time freezing occurs when the user performs watching, freezing event reporting of a player is triggered. Freezing reporting is passive relative to heartbeat reporting, is triggered by a watching behavior, and cannot be generated through simulation.

It should be noted that a reason for occurrence of freezing may be that user equipment is poor, a watched live room stream has a high requirement for performance of a device, and a current device cannot meet the requirement, or may be that a network speed is slow, a large bandwidth is required for watching the live room, or a network jitter occurs.

In actual application, when the content of the two types of user information is the same, the server device may distinguish and label the two types of user information based on different manners of sending the two types of user information by the client device. When the content of the two types of user information is different, respective information types, for example, a heartbeat type (access type) or a freezing type, may be recorded in the information content, so that the server device directly distinguishes, based on the information content of the received user information, which information type the user information belongs to.

Further, after the two types of information are received, user attribution information corresponding to the two types of information needs to be separately determined, to perform, based on the user attribution information, statistics collection on an access user condition and a freezing user condition of the target object.

In the foregoing example, after receiving the access user information infor1, the server device uses the province name "Anhui" and the network operator name "China Mobile" that correspond to ip1 as the access user attribution information. In addition, freezing user information cinfor1 that is sent by a client device B to the server device and that is of a user U2 accessing the live room 1 is received, where the freezing user information cinfor1 includes the live room identifier (room_id) "123" of the live room 1 and an IP address of a client device used by the user U2. After receiving the freezing user information cinfor1, the server device parses the freezing user information cinfor1 to obtain the IP address ip2 included in the freezing user information cinfor1. Query is performed in the GPS library based on ip2, to obtain the province name "Anhui" and a network operator name "China Unicom" that correspond to ip2. The province name "Anhui" and the network operator name "China Unicom" that correspond to ip2 are used as the freezing user attribution information. In addition, the access user attribution information and the freezing user attribution information are used as the user attribution information.

In conclusion, the access user information and the freezing user information are combined to determine the user attribution information of the two types of information, to determine an access user distribution condition and a freezing user distribution condition based on the user attribution information, and further perform access detection on the target object based on the two user distribution conditions, thereby improving access detection accuracy.

In actual application, if the quantity of access users of the target object is excessively small, it may be basically determined, based on the quantity of users, that the click-farming condition does not exist in the target object. Therefore, to avoid wasting detection resources, it is unnecessary to perform access detection on the target object. Therefore, whether the quantity of access users of the target object meets a detection standard may be determined first. After the detection standard is met, the target object is detected. In this embodiment of this application, the following manner is specifically used for implementation:

determining whether an information quantity of access user attribution information in the user attribution information in the predetermined duration of time is greater than a preset quantity threshold; and if the information quantity of access user attribution information in the user attribution information in the predetermined duration of time is greater than the preset quantity threshold, indicating that an access detection condition for the target object is met, and performing a step of determining attribution types of the user attribution information, and determining an access user distribution and a freezing user distribution in the predetermined duration of time based on the attribution types and the user attribution information; or if the information quantity of access user attribution information in the user attribution information in the predetermined duration of time is not greater than the preset quantity threshold, indicating that an access detection condition for the target object is not met, and performing no operation.

The information quantity may be understood as a quantity of pieces of information of the access user attribution information. In the predetermined duration of time, each time the server device receives one piece of access user attribution information, the information quantity increases by one. The information quantity may indicate a quantity of users accessing the target object in the predetermined duration of time. Correspondingly, the preset quantity threshold refers to a preset minimum quantity standard that the access user attribution information needs to meet when access detection is performed on the target object.

In the foregoing example, when the predetermined duration of time is 2021 Jul. 15 [10:00 AM to 10:30 AM], it is assumed that the information quantity of access user attribution information received by the server device in this time period is 10000, and the preset quantity threshold is 500. In this case, the information quantity is greater than the preset quantity threshold, it indicates that the access detection condition for the live room 1 is met, and the following step 104 is performed.

In conclusion, when the information quantity of the access user attribution information in the user attribution information in the predetermined duration of time is greater than the preset quantity threshold, access detection is performed on the target object, thereby avoiding wasting computing resources to perform meaningless access detection on the target object.

In addition to determining the user attribution information corresponding to the user information before access detection is performed on the target object, to improve diversity and flexibility of determining the user attribution information, user attribution information corresponding to second user information may be further determined in a detection process of the target object. In this embodiment of this application, the following manner is specifically used for implementation:

obtaining second user information of users accessing the target object in the predetermined duration of time; and determining user attribution information of the target object in the predetermined duration of time based on the second user information.

The second user information is user information received by the server device in the predetermined duration of time. In a specific implementation, a specific implementation of determining the user attribution information of the target object based on the second user information is similar to a specific implementation of determining the user attribution information of the target object based on the user information. References may be made to the specific implementation of determining the user attribution information of the target object based on the user information. Details are not described herein again.

In the foregoing example, when the predetermined duration of time is 2021 Jul. 15 [10:00 AM to 10:30 AM], the server device obtains the 10000 pieces of user information received in this time period for the live room 1, determines user attribution information corresponding to each piece of user information, and obtains 10000 pieces of user attribution information of the target object.

In conclusion, when access detection is performed on the target object, the second user information of the users accessing the target object in the predetermined duration of time is obtained, and the user attribution information of the target object in the predetermined duration of time is determined based on the second user information. This improves time diversity and flexibility of determining the user attribution information of the target object.

Step 104: Determine attribution types of the user attribution information, and determine an access user distribution and a freezing user distribution in the predetermined duration of time based on the attribution types and the user attribution information.

Specifically, on the basis of obtaining the user attribution information of the target object in the predetermined duration of time, if the user attribution information is dispersed, it is difficult to detect an access condition of the target object. Therefore, the attribution types of the user attribution information need to be determined, a user distribution condition in the predetermined duration of time is determined based on the attribution types, and then, whether abnormal access exists in the target object is determined based on the user distribution condition.

The attribution type is a type of user attribution information obtained after same attribution information is classified into one type. For example, the user attribution information is a province name. When 10000 pieces of user attribution information exist in the predetermined duration of time, but many of the 10000 pieces of user attribution information correspond to a same province, 34 provinces are obtained after province deduplication, and the 34 provinces are used as attribution types of the user attribution information.

The access user distribution is a distribution of the users accessing the target object. Specifically, the access user distribution may be a quantity distribution of the access users in the predetermined duration of time, or may be an age distribution, a gender distribution, or the like of the access users in the predetermined duration of time. For example, the access user distribution is a quantity distribution of the access users in the predetermined duration of time. Then, the access user distribution may be represented as a quantity distribution of users accessing the target object in each minute in the predetermined duration of time of 10:00 AM to 10:30 AM, that is, 30 minutes. Correspondingly, the freezing user distribution is a distribution of users with freezing reporting in the users accessing the target object. Specifically, the freezing user distribution may also be a quantity distribution, an age distribution, a gender distribution, or the like of the freezing users in the predetermined duration of time. This is not limited herein.

In a specific implementation, an information quantity of user attribution information may be used to represent a user quantity. To avoid using more user information (for example, a gender and an age) to perform statistics collection on the user distribution condition and consuming computing resources, access detection may be directly performed on the target object based on the quantity distribution of the access users and the quantity distribution of the freezing users. In this embodiment of this application, the following manner is specifically used for implementation:

determining time periods in the predetermined duration of time;

determining, based on the user attribution information, an access user quantity and a freezing user quantity of each attribution type in each time period; and using the access user quantity of each attribution type in each time period as the access user distribution in the predetermined duration of time, and using the freezing user quantity of each attribution type in each time period as the freezing user distribution in the predetermined duration of time.

The time period may be understood as that the predetermined duration of time is divided into at least one time sub-interval at a time interval, and each time sub-interval is one time period. The time period may be understood as a statistical time period, that is, quantity statistics collection is performed once on the user attribution information based on each time period. The access user quantity is a quantity of access users and the freezing user quantity is a quantity of freezing users. It should be noted that duration of the time period usually depends on a time interval reported by the client device.

In a specific implementation, an information type of the user attribution information may be first determined, for example, whether the user attribution information is a freezing type or an access type, and then statistics collection is performed on the access user quantity and the freezing user quantity of each attribution type in each time period based on the attribution type of the user attribution information. It is assumed that the attribution type is "province name+network operator name", "province name+network operator name" is used as a unique key, and statistics collection is performed on the access user quantity and the freezing user quantity in each time period. A single piece of data can be collected for any attribution type that exists in any time period. The data may include the following fields: [object identifier], [province name+network operator name], [access user quantity], and [freezing user quantity].

In the foregoing example, on the basis of obtaining the 10000 pieces of user attribution information, 102 attribution types of the 10000 pieces of user attribution information are determined, which are respectively as follows: ty1, ty2, ty3, . . . , and ty102. When the predetermined duration of time is 2021 Jul. 15 [10:00 AM to 10:30 AM], 30 minutes from 10:00 AM to 10:30 AM are divided at a time interval of 1 minute to obtain 30 time periods, where the 30 time periods are respectively t1, t2, t3, . . . , and t30. Then, the user attribution information of each time period is classified based on a type field corresponding to the user attribution information, to obtain user attribution information of an access type and user attribution information of a freezing type of each time period. Then, for the user attribution information of the access type of each time period, statistics collection is performed on an information quantity corresponding to each attribution type based on the attribution type to obtain the access user quantity; and for the user attribution information of the freezing type of each time period, statistics collection is performed on an information quantity corresponding to each attribution type based on the attribution type to obtain the freezing user quantity.

In conclusion, the access user quantity and the freezing user quantity of each attribution type in each time period in the predetermined duration of time are determined based on the user attribution information, thereby implementing statistics collection on the access user quantity and the freezing user quantity based on the time period and the attribution type, and using statistical results as the access user distribution and the freezing user distribution in the predetermined duration of time. Therefore, statistics collection efficiency is improved, and access detection efficiency of the target object is further improved.

Step 106: Calculate a distribution of freezing rates in the predetermined duration of time based on the access user distribution and the freezing user distribution.

Specifically, on the basis of determining the access user distribution and the freezing user distribution in the predetermined duration of time, it is considered that the distribution of freezing rates can be used to detect the access condition of the target object. Therefore, the distribution of freezing rates in the predetermined duration of time is calculated based on the obtained access user distribution and freezing user distribution, and then an access detection result of the target object is determined based on the distribution of freezing rates, thereby improving access detection accuracy.

The distribution of freezing rates may be a distribution of freezing rates of the attribution types, may be a distribution of freezing rates of the time periods, or may be a combination thereof. In addition, a corresponding distribution of freezing rates may alternatively be obtained based on these dimensions and another user attribute, for example, an age, a gender, or an occupation of a user. This is not limited herein.

In a specific implementation, on the basis of determining the access user quantity and the freezing user quantity, because the access condition of the target object cannot be accurately reflected based on only the access user quantity or only the freezing user quantity, a freezing rate corresponding to each attribution type in each time period is calculated based on the two types of data, and the access condition of the target object is determined based on the freezing rate. In this embodiment of this application, the following manner is specifically used for implementation:

calculating a freezing rate corresponding to each attribution type in each time period based on the access user quantity and the freezing user quantity of each attribution type in each time period; and using the freezing rate corresponding to each attribution type in each time period as the distribution of freezing rates in the predetermined duration of time.

In a specific implementation, the calculating a freezing rate corresponding to each attribution type in each time period based on the access user quantity and the freezing user quantity of each attribution type in each time period of the freezing user quantity of each attribution type to the access user quantity of each attribution type in each time period. In actual application, because the ratio is a decimal number, to facilitate calculation of the ratio, the ratio may be further multiplied by 100% to be converted into a percentage.

In the foregoing example, it is assumed that, in the time period t1, an access user quantity of an attribution type "Anhui+China Mobile" is 150, and a freezing user quantity of the attribution type "Anhui+China Mobile" is 15. Then, a freezing rate corresponding to the attribution type "Anhui+China Mobile" in the time period t1 is $15/150=0.1$.

In conclusion, the freezing rate corresponding to each attribution type in each time period is calculated based on the access user quantity and the freezing user quantity of each attribution type in each time period, thereby calculating the freezing rate in dimensions of the time period and the attribution type. Therefore, calculation of the freezing rate in such detailed dimensions facilitates positioning of an abnormal access condition of the target object.

Step 108: Determine an access detection result of the target object based on the distribution of freezing rates.

Specifically, on the basis of determining the distribution of freezing rates, the access detection result of the target object may be determined based on whether the distribution of freezing rates conforms to a normal rule.

The access detection result includes two results: abnormal access and normal access. The abnormal access indicates that it is detected that the click-farming condition exists in the target object, and a punitive measure, for example, closing the target object or presetting a cooling-off period, needs to be performed on the target object, to effectively prevent click-farming. The normal access indicates that it is detected that the click-farming condition does not exist in the target object, and no processing needs to be performed.

In a specific implementation, if the calculated distribution of freezing rates is not compared with reference data, it is difficult to analyze whether the access detection result is abnormal. Therefore, to improve access detection accuracy of the target object, an average value and a standard deviation of freezing rates of each attribution type in the predetermined duration of time may be calculated, and then the reference data is determined based on calculation results. In this embodiment of this application, the following steps are specifically used for implementation:

Step 1082: Calculate, based on the freezing rate corresponding to each attribution type in each time period, a freezing rate average value and a freezing rate standard deviation that correspond to each attribution type.

The freezing rate average value is obtained by calculating an average value of freezing rates corresponding to each attribution type in the predetermined duration of time. Correspondingly, the freezing rate standard deviation is obtained by calculating a standard deviation of the freezing rates corresponding to each attribution type in the predetermined duration of time.

In actual application, it is considered that some freezing rates with large deviations caused by a data error may exist in these calculated freezing rates. To avoid an adverse effect caused by the freezing rates on a calculation result, these defective freezing rates may be filtered out before these freezing rates are used to calculate the freezing rate average value and the freezing rate standard deviation. In this embodiment of this application, the following manner is specifically used for implementation:

determining a first freezing rate quantity of freezing rates corresponding to each attribution type in the predetermined duration of time;

determining a second freezing rate quantity based on the first freezing rate quantity and a preset quantity proportion;

ranking the freezing rates corresponding to each attribution type in the predetermined duration of time to obtain a ranking result; and updating the freezing rates corresponding to each attribution type based on the second freezing rate quantity, and using updated freezing rates corresponding to each attribution type as freezing rates corresponding to each attribution type.

The first freezing rate quantity is a quantity of freezing rates corresponding to each attribution type in the predetermined duration of time. Correspondingly, the preset quantity proportion may be understood as a proportion of the defective freezing rates that need to be filtered out from the freezing rates corresponding to each attribution type, for example, the preset quantity proportion may be 5%, 3%, and the like. This is not limited herein. The second freezing rate quantity is a quantity that is calculated based on a product of the first freezing rate quantity and the preset quantity proportion and that is of freezing rates that need to be filtered out from the freezing rates corresponding to each attribution type.

Further, on the basis of calculating the second freezing rate quantity, the freezing rates corresponding to each attribution type in the predetermined duration of time are separately sorted to obtain the ranking result. Then, freezing rates of the second freezing rate quantity are removed from the ranking result. In actual application, lowest freezing rates of the second freezing rate quantity may be removed from the ranking result. Alternatively, the second freezing rate quantity may be divided by 2 to obtain a quotient value, and highest freezing rates of a quantity corresponding to the quotient value and lowest freezing rates of the quantity corresponding to the quotient value are removed from the ranking result.

For example, there are 30 freezing rates corresponding to the attribution type "Anhui+China Mobile" in 30 minutes. When the preset quantity proportion is 10%, the second freezing rate quantity of defective freezing rates that need to be filtered out for the attribution type "Anhui+China Mobile" is calculated as 30*10%=3. Then, the 30 freezing rates are sorted in ascending order, and the first three freezing rates are removed from a sorting result to obtain the remaining 27 freezing rates.

In conclusion, the defective freezing rates are filtered out from the freezing rates corresponding to each attribution type in the predetermined duration of time, to ensure accuracy of subsequent calculation of the freezing rate average value and the freezing rate standard deviation, thereby further improving accuracy of the access detection result of the target object.

Step 1084: Select abnormal freezing rates in freezing rates corresponding to each attribution type in the predetermined duration of time based on the freezing rate average value and the freezing rate standard deviation that correspond to each attribution type.

Specifically, on the basis of calculating the freezing rate average value and the freezing rate standard deviation, the abnormal freezing rates are selected from the freezing rates corresponding to each attribution type based on the two types of data.

The abnormal freezing rate refers to an abnormal ratio of the freezing user quantity to the access user quantity.

In a specific implementation, if the freezing rate average value and the freezing rate standard deviation are separately used to determine the abnormal freezing rates, more computing costs are required, and an inaccurate determining condition may occur. Therefore, the freezing rate average value and the freezing rate standard deviation may be combined to determine one abnormality detection interval, and the abnormal freezing rates are determined based on the abnormality detection interval. In this embodiment of this application, the following manner is specifically used for implementation:

calculating an abnormality detection interval corresponding to each attribution type based on the freezing rate average value and the freezing rate standard deviation that correspond to each attribution type; and selecting, from the freezing rates corresponding to each attribution type in the predetermined duration of time, freezing rates that are not in the abnormality detection interval corresponding to each attribution type as the abnormal freezing rates corresponding to each attribution type.

The abnormality detection interval may be understood as a numerical interval used to detect the abnormal freezing rates. Specifically, if the freezing rates are in the abnormality detection interval, it indicates that the freezing rates are normal; or if the freezing rates are not in the abnormality detection interval, it indicates that the freezing rates are abnormal.

In actual application, values of the abnormality detection interval may be [the freezing rate average value−the freezing rate standard deviation, the freezing rate average value+the freezing rate standard deviation]. In addition, the values of the abnormality detection interval may alternatively be [the freezing rate average value−2*the freezing rate standard deviation, the freezing rate average value+2*the freezing rate standard deviation], or the like. This is not limited herein.

In a specific implementation, the corresponding freezing rate average value and freezing rate standard deviation are calculated for the freezing rates of each attribution type. Therefore, the abnormality detection interval corresponding to each attribution type may be further determined based on the two types of data obtained through calculation, that is, any freezing rate may be compared with an abnormality detection interval whose attribution type is the same as that of the freezing rate. If the any freezing rate is in the abnormality detection interval corresponding to the any freezing rate, the any freezing rate is a normal freezing rate; or if the any freezing rate is not in the abnormality detection interval corresponding to the any freezing rate, the any freezing rate is an abnormal freezing rate.

In the foregoing example, it is assumed that, in 30 minutes, the freezing rate average value of the 27 freezing rates corresponding to the attribution type "Anhui+China Mobile" is a1, and a standard deviation of the 27 freezing rates is s1. In this case, the abnormality detection interval corresponding to the attribute type "Anhui+China Mobile" is [a1−s1, a1+s1]. Whether each of the 27 freezing rates is in the abnormality detection interval [a1−s1, a1+s1] is separately determined. If each of the 27 freezing rates is in the abnormality detection interval [a1−s1, a1+s1], the freezing rate is determined as an abnormal freezing rate.

In conclusion, the abnormality detection interval corresponding to each attribution type is first calculated based on the freezing rate average value and the freezing rate standard deviation that correspond to each attribution type, and then the abnormal freezing rates are determined based on the abnormality detection interval, thereby reducing a calculation amount, and improving accuracy of determining the abnormal freezing rates.

Step 1086: Determine the access detection result of the target object based on a total quantity of freezing rates corresponding to each attribution type and an abnormality quantity of abnormal freezing rates corresponding to each attribution type.

Specifically, on the basis of determining the abnormal freezing rates, the abnormal freezing rates indicate that the access user quantity and the freezing user quantity that correspond to the attribution type are abnormal. However, it is considered that an occasional abnormality does not necessarily indicate that an abnormal access condition exists in the target object. Therefore, the access detection result of the target object can be determined based on a proportion of the abnormal freezing rates.

In a specific implementation, to accurately determine the access detection result of the target object, a proportion standard may be set for the proportion of the abnormal freezing rates, and the access detection result of the target object is determined based on the proportion standard. In this embodiment of this application, the following manner is specifically used for implementation:

calculating ratios of abnormality quantities of abnormal freezing rates corresponding to each attribution type to total quantities of freezing rates corresponding to each attribution type;
  determining whether a ratio greater than a preset ratio threshold exists in the ratios; and
  if a ratio greater than the preset ratio threshold exists in the ratios, indicating that an abnormal access condition exists in the target object, and determining that the access detection result of the target object is abnormal access; or
  if a ratio greater than the preset ratio threshold does not exist in the ratios, indicating that an abnormal access condition does not exist in the target object, and determining that the access detection result of the target object is normal access.

In actual application, because there are abnormal freezing rate proportions of a plurality of attribution types, when an abnormal freezing rate proportion of any attribution type is greater than a preset proportion standard (that is, the preset ratio threshold), it indicates that the abnormal access condition exists in the target object, and the access detection result of the target object can be determined as abnormal access.

In the foregoing example, it is assumed that, in 30 minutes, there are six abnormal freezing rates in the 27 freezing rates corresponding to the attribution type "Anhui+China Mobile", a ratio of the abnormal quantity 6 of abnormal freezing rates of the attribution type "Anhui+China Mobile" to the total quantity 27 of corresponding freezing rates is calculated as 6/27=22%. When the preset ratio threshold is 10%, the ratio is greater than the preset ratio threshold, and the access detection result of the live room 1 is determined as abnormal access, that is, it indicates that the click-farming condition exists in the live room 1.

It is assumed that a ratio greater than 10% does not exist in ratios calculated for the 102 attribution types, and then the access detection result of the live room 1 is determined as normal access.

In conclusion, the ratios of the abnormality quantities of abnormal freezing rates corresponding to each attribution type to the total quantities of freezing rates corresponding to each attribution type are calculated. When any ratio is greater than the preset ratio threshold, the access detection result of the target object is determined as abnormal access. Therefore, fineness of access detection of the target object is improved, and access detection accuracy of the target object is also improved.

In conclusion, according to the access detection method provided in this application, the user attribution information of the target object in the predetermined duration of time is obtained to determine the attribution types of the user attribution information, and the access user distribution and the freezing user distribution in the predetermined duration of time are determined based on the attribution types and the user attribution information. In this way, statistics collection is performed on the access user distribution and the freezing user distribution of the target object based on the attribution types. In addition, with reference to the access user distribution and the freezing user distribution, the distribution of freezing rates in the predetermined duration of time is calculated, and the access detection result of the target object is determined based on the distribution of freezing rates. In this way, whether abnormal access exists in the target object is detected in a manner of analyzing the freezing rates, thereby effectively improving detection precision to facilitate reasonable management performed by a downstream service on the target object in which abnormal access exists.

With reference to FIG. 2, the following further describes the access detection method by using application of the access detection method provided in this application to a livestreaming scene as an example. FIG. 2 is a flowchart of processing of an access detection method applied to a livestreaming scene according to an embodiment of this application. The processing specifically includes the following steps.

Step 202: At least one live room client device triggers, at an interval of 1 minute, a live page to which a live room A belongs, to send, to a live server device, access user information of users accessing the live room A.

Specifically, a time interval may be 1 minute or 2 minutes, and a value may be set based on an actual requirement. This is not limited herein. The access user information may be understood as periodic heartbeat reporting of the live room client, and the access user information includes a room number of the live room A and an IP address of a reporting live room client.

Figure 3:
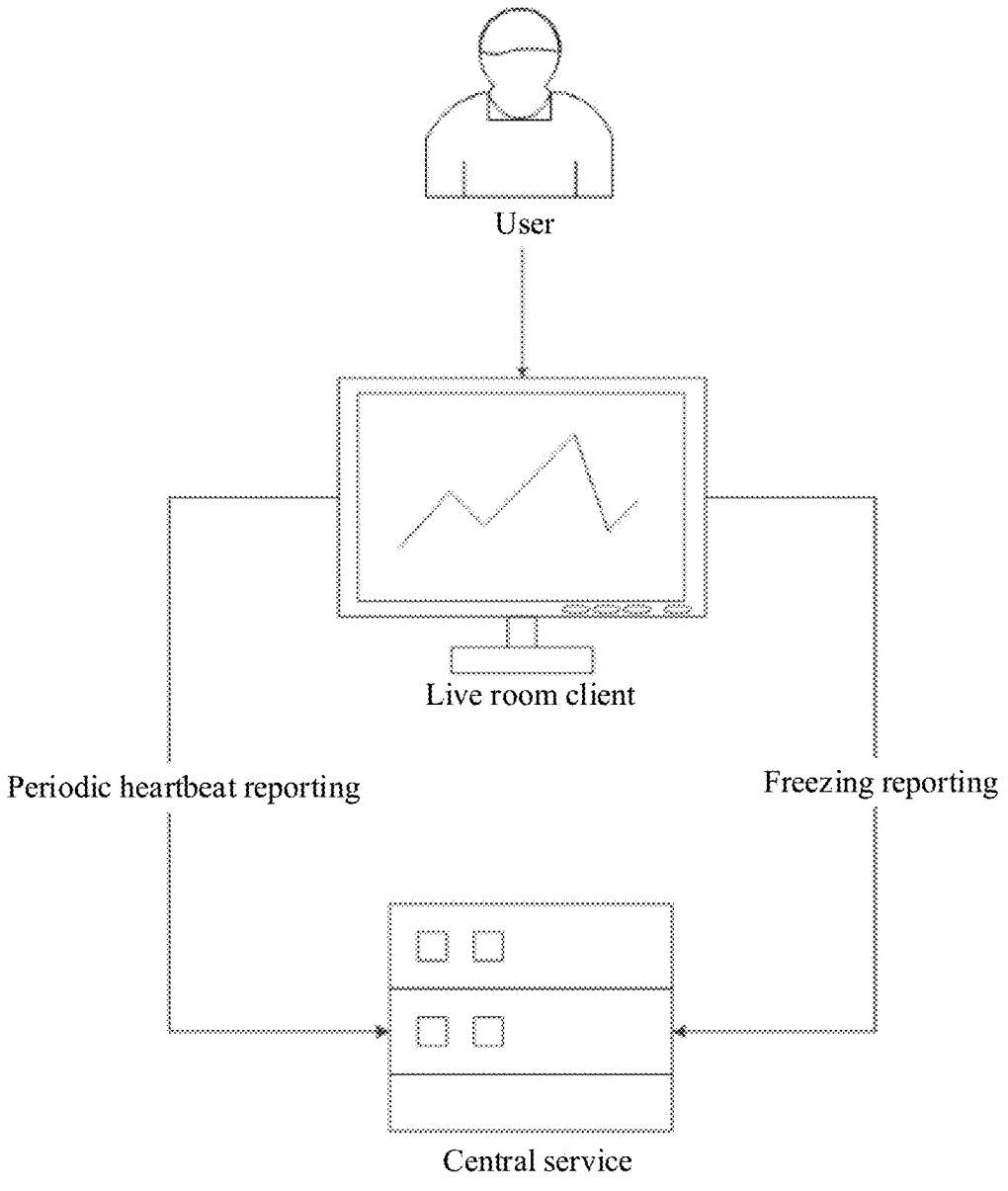
FIG. 3 is a schematic diagram of information reporting in an access detection method according to an embodiment of this application.

In actual application, as described in FIG. 3, the access user information sent by the live room client to the live server device (service center) at the time interval may be understood as heartbeat information periodically reported by the live room client to the live server device. The heartbeat information indicates that a user is currently watching the live room A.

Step 204: When detecting that a freezing condition occurs in the live room A, the at least one live room client sends freezing user information of the users to the live server device.

Specifically, the freezing user information may be understood as freezing reporting of the live room client. The freezing user information includes the room number of the live room A and an IP address of a reporting live room client.

In actual application, the freezing reporting is passive, is triggered by a watching behavior, and cannot be generated through simulation. Specifically, as shown in FIG. 3, if a freezing phenomenon occurs in the live room A when a user watches the live room A by using a live room client, freezing is reported to the live server device (service center) when freezing or artifact is monitored by a player during live pulling.

Step 206: The live server device receives the access user information and the freezing user information that are sent by the at least one live room client.

Step 208: Determine access user attribution information of the live room A based on the access user information, determine freezing user attribution information of the live room A based on the freezing user information, and use the access user attribution information and the freezing user attribution information as user attribution information.

Specifically, the live server device performs query in a GPS library based on the IP address carried in the access user information to obtain a province and a network operator that correspond to the IP address, and use the queried province and network operator as a province in which a user is located and an operator serving the user, that is, the access user attribution information.

Similarly, the live server device performs query in the GPS library based on the IP address carried in the freezing user information to obtain a province and a network operator that correspond to the IP address, and use the queried province and network operator as a province in which a user is located and an operator serving the user, that is, the freezing user attribution information.

Step 210: Obtain user attribution information of the live room A in a predetermined duration of time.

Specifically, user attribution information of the live room A in 30 minutes of 2021 Aug. 2 [9:00 PM, 9:30 PM] is obtained.

Step 212: Determine attribution types of the user attribution information, and determine 30 time periods in the predetermined duration of time at a time interval of 1 minute.

Specifically, 100 attribution types are determined based on the obtained user attribution information and based on "province+operator".

Step 214: Determine an access user quantity and a freezing user quantity of each attribution type in each time period in the predetermined duration of time based on the user attribution information.

Specifically, it is assumed that statistics collection is performed on an attribution type "Hebei+China Mobile" in a plurality of attribution types in a first time period of the 30 time periods, for example, a first time period in 30 minutes of 2021 Aug. 2 [9:00 PM, 9:30 PM], to obtain an access user quantity 280 and a freezing user quantity 28 that correspond to the attribution type "Hebei+China Mobile".

Step 216: Calculate a ratio of the access user quantity to the freezing user quantity of each attribution type in each time period, and use the ratio as a freezing rate corresponding to each attribution type in each time period.

Specifically, the freezing rate corresponding to the attribution type "Hebei+China Mobile" is 28/280=0.1.

Step 218: Determine a freezing rate quantity q1 of freezing rates corresponding to each attribution type in the predetermined duration of time.

Specifically, there are 30 time periods in the predetermined duration of time. It is assumed that each time period includes the freezing rate of each attribution type. Then the freezing rate quantity q1 of freezing rates corresponding to each attribution type in the predetermined duration of time is 30.

Step 220: Determine a product of the freezing rate quantity q1 and a preset quantity proportion 5% as a freezing rate quantity q2.

Specifically, the product of q1 and the preset quantity proportion 5% is calculated as 30*5%=1.5, q2 is rounded up, and the freezing rate quantity q2 is determined as 2.

Step 222: Sort the freezing rates corresponding to each attribution type in the predetermined duration of time to obtain a sorting result.

Specifically, for the attribution type "Hebei+China Mobile" in the plurality of attribution types, the 30 freezing rates corresponding to the attribution type "Hebei+China Mobile" are sorted in ascending order to obtain the sorting result.

Step 224: Update the freezing rates corresponding to each attribution type based on the freezing rate quantity q2, and use updated freezing rates corresponding to each attribution type as freezing rates corresponding to each attribution type.

Specifically, the first two freezing rates are removed from the sorting result to obtain updated freezing rates corresponding to the attribution type "Hebei+China Mobile".

Step 226: Calculate, based on the freezing rate corresponding to each attribution type in each time period, a freezing rate average value and a freezing rate standard deviation that correspond to each attribution type.

Specifically, a freezing rate average value $\bar{x}$ and a freezing rate standard deviation $\sigma$ of 28 freezing rates corresponding to the attribution type "Hebei+China Mobile" are calculated.

Step 228: Calculate an abnormality detection interval corresponding to each attribution type based on the freezing rate average value and the freezing rate standard deviation that correspond to each attribution type.

Specifically, the abnormality detection interval is $[\bar{x}-\sigma\sigma, \bar{x}+\sigma]$.

Step 230: Select, from the freezing rates corresponding to each attribution type in the predetermined duration of time, freezing rates that are not in the abnormality detection interval corresponding to each attribution type as the abnormal freezing rates corresponding to each attribution type.

Specifically, whether each of the 28 freezing rates corresponding to the attribution type "Hebei+China Mobile" is in the abnormality detection interval $[\bar{x}-\sigma, \bar{x}+\sigma]$ is determined, and five freezing rates that are not in the abnormality detection interval $[\bar{x}-\sigma, \bar{x}+\sigma]$ are selected as abnormal freezing rates based on a determining result.

Step 232: Calculate ratios of abnormality quantities of abnormal freezing rates corresponding to each attribution type to total quantities of freezing rates corresponding to each attribution type.

Specifically, for the attribution type "Hebei+China Mobile", a ratio of an abnormality quantity 5 of abnormal freezing rates to a total quantity 28 of freezing rates is calculated as 0.18.

Step 234: Determine whether a ratio greater than a preset ratio threshold exists in the ratios; and if a ratio greater than the preset ratio threshold exists in the ratios, indicate that click-farming access exists in the live room A, and perform the following step 236; or if a ratio greater than the preset ratio threshold does not exist in the ratios, indicate that click-farming access does not exist in the live room A, and perform the following step 238.

Specifically, when the preset ratio threshold is 10%, and it is determined that the ratio 0.18 corresponding to the attribution type "Hebei+China Mobile" is greater than the preset ratio threshold 10%, it indicates that click-farming access exists in the live room A, and the following step 236 is performed.

It is assumed that when it is determined that the ratio corresponding to the attribution type "Hebei+China Mobile" is not greater than the preset ratio threshold 10%, whether a ratio greater than the preset ratio threshold 10% exists in 99 ratios calculated for the other 99 attribution types is determined. If the ratio greater than the preset ratio threshold 10% exists in the 99 ratios calculated for the other 99 attribution types, it indicates that click-farming access exists in the live room A, and the following step 236 is performed. If the ratio greater than the preset ratio threshold 10% does not exist in the 99 ratios calculated for the other 99 attribution types, it indicates that click-farming access does not exist in the live room A, and the following step 238 is performed.

Step 236: Determine that an access detection result of the live room A is click-farming access.

Step 238: Determine that an access detection result of the live room A is normal access.

In conclusion, according to the access detection method provided in this application, the live server device receives the access user information and the freezing user information that are sent by the at least one live room client, and parses the two types of information that are received, to obtain the corresponding user attribution information; and obtains the user attribution information of the live room A in the predetermined duration of time, determines the attribution types of the user attribution information, and determines the access user distribution and the freezing user distribution in the predetermined duration of time based on the attribution types and the user attribution information. Therefore, statistics collection for the access user distribution and the freezing user distribution of the live room A is implemented based on the attribution types. In addition, with reference to the access user distribution and the freezing user distribution, the distribution of freezing rates in the predetermined duration of time is calculated, and the access detection result of the live room A is determined based on the distribution of freezing rates. In this way, whether abnormal access exists in the live room A is detected in a manner of analyzing the freezing rates, thereby effectively improving detection precision to facilitate reasonable management performed by a downstream service on the live room in which abnormal access exists.

Figure 4:
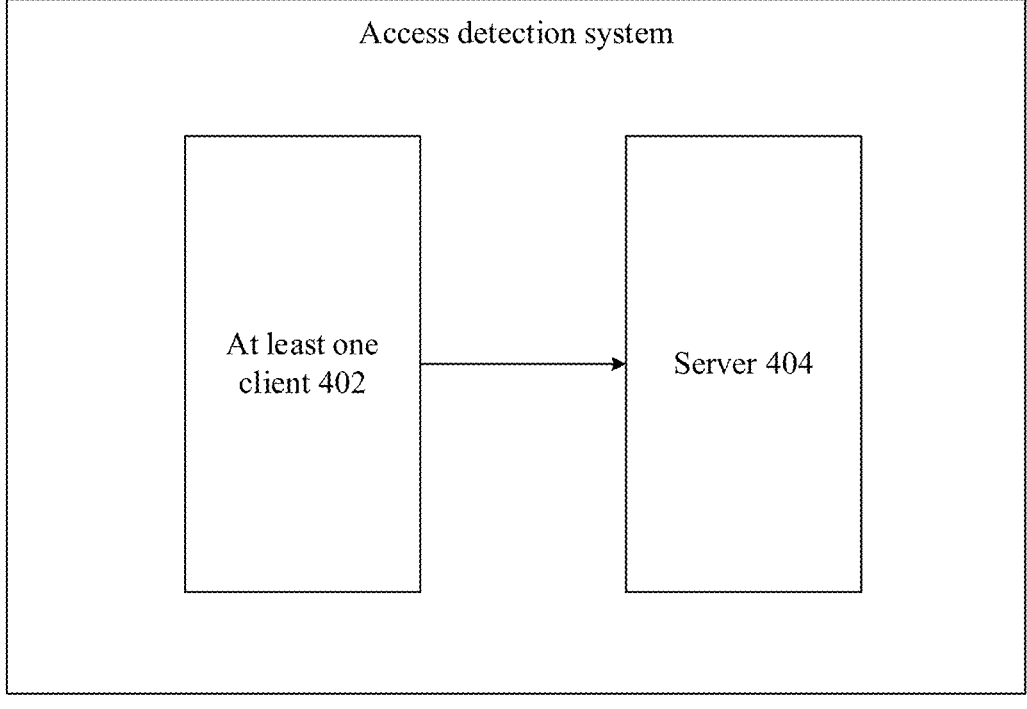
FIG. 4 is a schematic diagram of a structure of an access detection system according to an embodiment of this application.

FIG. 4 is a schematic diagram of a structure of an access detection system according to an embodiment of this application. As shown in FIG. 4, the system includes:

at least one client device 402 and a server device 404.

The at least one client 402 is configured to send, to the server device, user information for accessing a target object.

The server device 404 is configured to: receive the user information sent by the at least one client; determine user attribution information of the target object based on the user information; obtain user attribution information of the target object in a predetermined duration of time; determine attribution types of the user attribution information, and determine an access user distribution and a freezing user distribution in the predetermined duration of time based on the attribution types and the user attribution information; calculate a distribution of freezing rates in the predetermined duration of time based on the access user distribution and the freezing user distribution; and determine an access detection result of the target object based on the distribution of freezing rates.

Optionally, the at least one client 402 is further configured to:

trigger, at a time interval, an object page to which the target object belongs, to send, to the server device, access user information of users accessing the target object; and when it is detected that freezing occurs in the target object, send freezing user information of the users to the server device.

Specifically, the predetermined duration of time may be 1 minute or 2 minutes, and a value may be set based on an actual requirement. This is not limited herein.

Optionally, the server device 404 is further configured to:
determine time periods in the predetermined duration of time;

determine, based on the user attribution information, an access user quantity and a freezing user quantity of each attribution type in each time period; and use the access user quantity of each attribution type in each time period as the access user distribution in the predetermined duration of time, and use the freezing user quantity of each attribution type in each time period as the freezing user distribution in the predetermined duration of time.

Optionally, the server device 404 is further configured to:
calculate a freezing rate corresponding to each attribution type in each time period based on the access user quantity and the freezing user quantity of each attribution type in each time period; and use the freezing rate corresponding to each attribution type in each time period as the distribution of freezing rates in the predetermined duration of time.

Optionally, the server device 404 is further configured to:
calculate, based on the freezing rate corresponding to each attribution type in each time period, a freezing rate average value and a freezing rate standard deviation that correspond to each attribution type;

select abnormal freezing rates in freezing rates corresponding to each attribution type in the predetermined duration of time based on the freezing rate average value and the freezing rate standard deviation that correspond to each attribution type; and etermine the access detection result of the target object based on a total quantity of freezing rates corresponding to each attribution type and an abnormality quantity of abnormal freezing rates corresponding to each attribution type.

Optionally, the server device 404 is further configured to:

calculate an abnormality detection interval corresponding to each attribution type based on the freezing rate average value and the freezing rate standard deviation that correspond to each attribution type; and select, from the freezing rates corresponding to each attribution type in the predetermined duration of time, freezing rates that are not in the abnormality detection interval corresponding to each attribution type as the abnormal freezing rates corresponding to each attribution type.

Optionally, the server device 404 is further configured to:

calculate ratios of abnormality quantities of abnormal freezing rates corresponding to each attribution type to total quantities of freezing rates corresponding to each attribution type;

determine whether a ratio greater than a preset ratio threshold exists in the ratios; and if a ratio greater than the preset ratio threshold exists in the ratios, determine that the access detection result of the target object is abnormal access; or if a ratio greater than the preset ratio threshold does not exist in the ratios, determine that the access detection result of the target object is normal access.

Optionally, the server device 404 is further configured to:

determine a first freezing rate quantity of freezing rates corresponding to each attribution type in the predetermined duration of time;

determine a second freezing rate quantity based on the first freezing rate quantity and a preset quantity proportion;

sort the freezing rates corresponding to each attribution type in the predetermined duration of time to obtain a sorting result; and update the freezing rates corresponding to each attribution type based on the second freezing rate quantity, and use updated freezing rates corresponding to each attribution type as freezing rates corresponding to each attribution type.

Optionally, the server device 404 is further configured to:

parse the user information to obtain an address identifier; and query location information and network information that correspond to the address identifier, and use the location information and the network information as the user attribution information of the target object, or query location information corresponding to the address identifier, and use the location information as the user attribution information of the target object.

Optionally, the server device 404 is further configured to:

receive access user information and freezing user information of the users accessing the target object; and use the access user information and the freezing user information as the user information.

Correspondingly, the determining the user attribution information of the target object based on the user information includes:

determining access user attribution information of the target object based on the access user information in the user information, and determining freezing user attribution information of the target object based on the freezing user information in the user information; and using the access user attribution information and the freezing user attribution information as the user attribution information.

Optionally, the server device 404 is further configured to:

determine whether an information quantity of access user attribution information in the user attribution information in the predetermined duration of time is greater than a preset quantity threshold; and if the information quantity of access user attribution information in the user attribution information in the predetermined duration of time is greater than the preset quantity threshold, perform the step of determining the attribution types of the user attribution information, and determining the access user distribution and the freezing user distribution in the predetermined duration of time based on the attribution types and the user attribution information.

In conclusion, in the access detection system provided in this application, the at least one client cooperates with the server device, and the client sends the user information to the server device. The server device receives the user information and determines the user attribution information of the user information, determines the attribution types of the user attribution information by obtaining the user attribution information of the target object in the predetermined duration of time, and determines the access user distribution and the freezing user distribution in the predetermined duration of time based on the attribution types and the user attribution information, thereby performing, based on the attribution types, statistics collection on the access user distribution and the freezing user distribution of the target object. In addition, with reference to the access user distribution and the freezing user distribution, the distribution of freezing rates in the predetermined duration of time is calculated, and the access detection result of the target object is determined based on the distribution of freezing rates. In this way, whether abnormal access exists in the target object is detected in a manner of analyzing the freezing rates, thereby effectively improving detection precision to facilitate reasonable management performed by a downstream service on the target object in which abnormal access exists.

The foregoing describes a schematic solution of the access detection system in this embodiment. It should be noted that the technical solution of the access detection system and the technical solution of the foregoing access detection method belong to a same concept. For detailed content not described in detail in the technical solution of the access detection system, refer to the descriptions of the technical solution of the foregoing access detection method.

Figure 5:
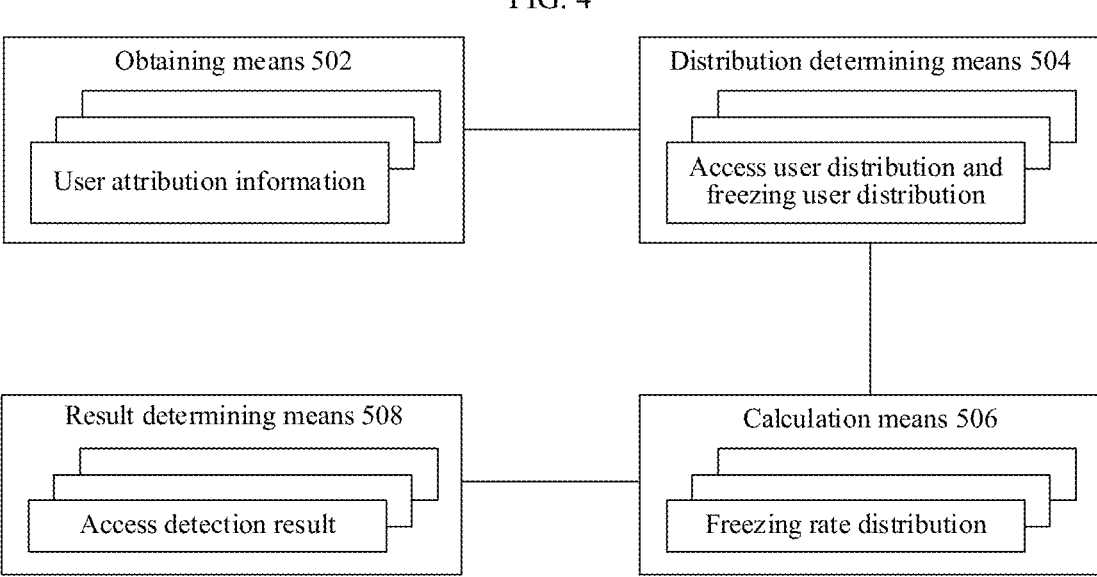
FIG. 5 is a schematic diagram of a structure of an access detection apparatus according to an embodiment of this application.

Corresponding to the foregoing method embodiments, this application further provides an embodiment of an access detection apparatus. FIG. 5 is a schematic diagram of a structure of an access detection apparatus according to an embodiment of this application. As shown in FIG. 5, the apparatus includes:

an obtaining means 502, configured to obtain user attribution information of a target object in a predetermined duration of time;

a distribution determining means 504, configured to determine attribution types of the user attribution information, and determine an access user distribution and a freezing user distribution in the predetermined duration of time based on the attribution types and the user attribution information;

a calculation means 506, configured to calculate a distribution of freezing rates in the predetermined duration of time based on the access user distribution and the freezing user distribution; and a result determining means 508, configured to determine an access detection result of the target object based on the distribution of freezing rates.

Optionally, the distribution determining means 504 is further configured to:

determine time periods in the predetermined duration of time;

determine, based on the user attribution information, an access user quantity and a freezing user quantity of each attribution type in each time period; and use the access user quantity of each attribution type in each time period as the access user distribution in the predetermined duration of time, and use the freezing user quantity of each attribution type in each time period as the freezing user distribution in the predetermined duration of time.

Optionally, the calculation means 506 is further configured to:

calculate a freezing rate corresponding to each attribution type in each time period based on the access user quantity and the freezing user quantity of each attribution type in each time period; and use the freezing rate corresponding to each attribution type in each time period as the distribution of freezing rates in the predetermined duration of time.

Optionally, the result determining means 508 includes:

a standard deviation calculation sub-means, configured to calculate, based on the freezing rate corresponding to each attribution type in each time period, a freezing rate average value and a freezing rate standard deviation that correspond to each attribution type;

a selection sub-means, configured to select abnormal freezing rates in freezing rates corresponding to each attribution type in the predetermined duration of time based on the freezing rate average value and the freezing rate standard deviation that correspond to each attribution type; and a detection result determining sub-means, configured to determine the access detection result of the target object based on a total quantity of freezing rates corresponding to each attribution type and an abnormality quantity of abnormal freezing rates corresponding to each attribution type.

Optionally, the selection sub-means is further configured to:

calculate an abnormality detection interval corresponding to each attribution type based on the freezing rate average value and the freezing rate standard deviation that correspond to each attribution type; and select, from the freezing rates corresponding to each attribution type in the predetermined duration of time, freezing rates that are not in the abnormality detection interval corresponding to each attribution type as the abnormal freezing rates corresponding to each attribution type.

Optionally, the detection result determining sub-means is further configured to:

calculate ratios of abnormality quantities of abnormal freezing rates corresponding to each attribution type to total quantities of freezing rates corresponding to each attribution type;

determine whether a ratio greater than a preset ratio threshold exists in the ratios; and if a ratio greater than the preset ratio threshold exists in the ratios, determine that the access detection result of the target object is abnormal access; or if a ratio greater than the preset ratio threshold does not exist in the ratios, determine that the access detection result of the target object is normal access.

Optionally, the result determining means 508 further includes:

a first quantity determining sub-means, configured to determine a first freezing rate quantity of freezing rates corresponding to each attribution type in the predetermined duration of time;

a second quantity determining sub-means, configured to determine a second freezing rate quantity based on the first freezing rate quantity and a preset quantity proportion;

a sorting sub-means, configured to sort the freezing rates corresponding to each attribution type in the predetermined duration of time to obtain a sorting result; and an update sub-means, configured to update the freezing rates corresponding to each attribution type based on the second freezing rate quantity, and use updated freezing rates corresponding to each attribution type as freezing rates corresponding to each attribution type.

Optionally, the access detection apparatus further includes:

a receiving means, configured to receive user information of users accessing the target object; and an information determining means, configured to determine the user attribution information of the target object based on the user information.

Optionally, the information determining means includes:

a parsing sub-means, configured to parse the user information to obtain an address identifier; and a query sub-means, configured to query location information and network information that correspond to the address identifier, and use the location information and the network information as the user attribution information of the target object, or query location information corresponding to the address identifier, and use the location information as the user attribution information of the target object.

Optionally, the receiving means is further configured to:

receive access user information and freezing user information of the users accessing the target object; and use the access user information and the freezing user information as the user information.

Correspondingly, the information determining means is further configured to:

determine access user attribution information of the target object based on the access user information in the user information, and determine freezing user attribution information of the target object based on the freezing user information in the user information; and use the access user attribution information and the freezing user attribution information as the user attribution information.

Optionally, the access detection apparatus further includes:

a determining means, configured to determine whether an information quantity of access user attribution information in the user attribution information in the predetermined duration of time is greater than a preset quantity threshold; and if the information quantity of access user attribution information in the user attribution information in the predetermined duration of time is greater than the preset quantity threshold, run the distribution determining means 504.

Optionally, the obtaining means 502 is further configured to:

obtain second user information of users accessing the target object in the predetermined duration of time; and determine user attribution information of the target object in the predetermined duration of time based on the second user information.

In conclusion, in the access detection apparatus provided in this application, the user attribution information of the target object in the predetermined duration of time is obtained to determine the attribution types of the user attribution information, and the access user distribution and the freezing user distribution in the predetermined duration of time are determined based on the attribution types and the user attribution information. In this way, statistics collection is performed on the access user distribution and the freezing user distribution of the target object based on the attribution types. In addition, with reference to the access user distribution and the freezing user distribution, the distribution of freezing rates in the predetermined duration of time is calculated, and the access detection result of the target object is determined based on the distribution of freezing rates. In this way, whether abnormal access exists in the target object is detected in a manner of analyzing the freezing rates, thereby effectively improving detection precision to facilitate reasonable management performed by a downstream service on the target object in which abnormal access exists.

The foregoing describes a schematic solution of the access detection apparatus in this embodiment. It should be noted that the technical solution of the access detection apparatus and the technical solution of the foregoing access detection method belong to a same concept. For detailed content not described in detail in the technical solution of the access detection apparatus, refer to the descriptions of the technical solution of the foregoing access detection method.

Figure 6:
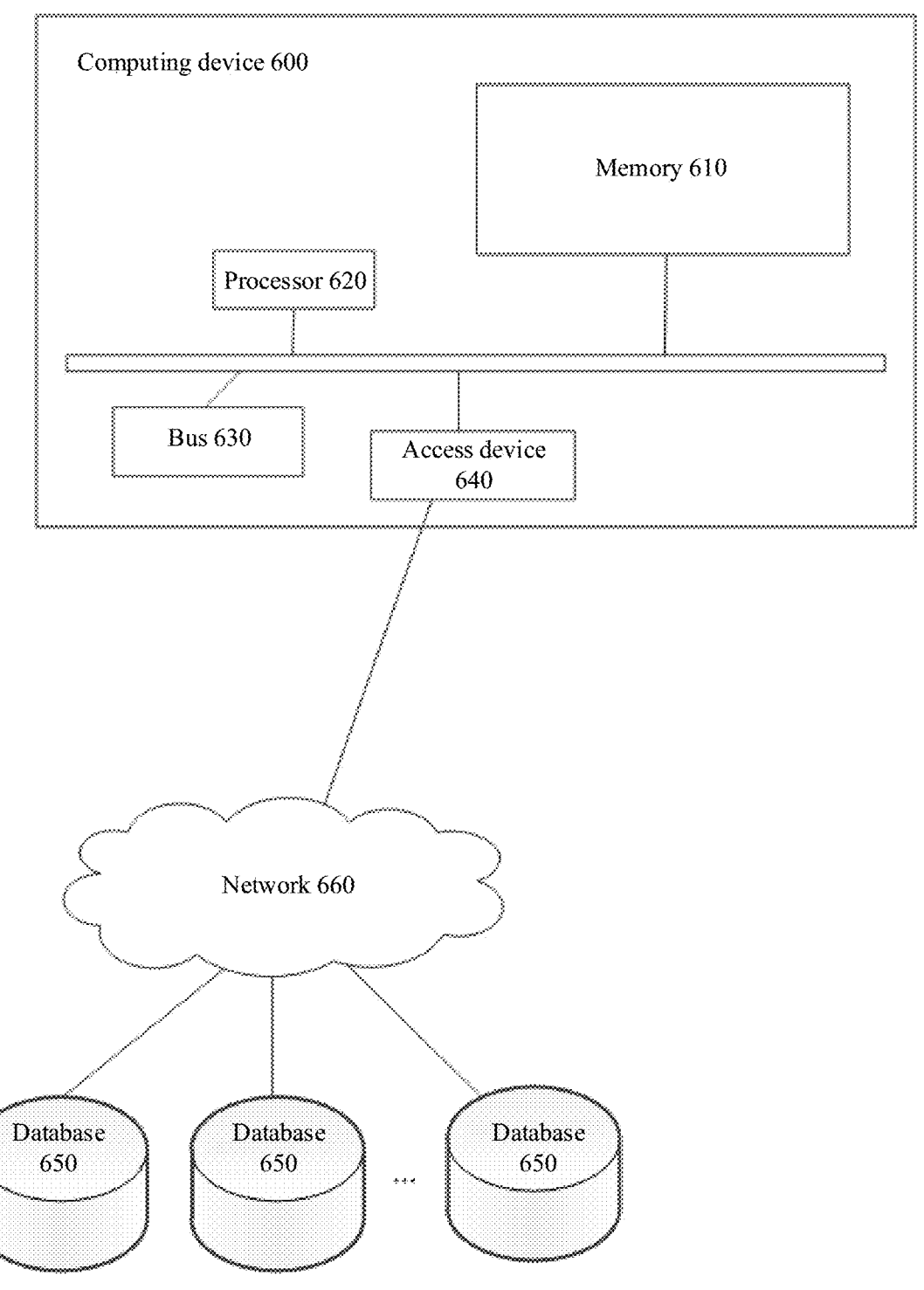
FIG. 6 is a block diagram of a structure of a computing device according to an embodiment of this application.

FIG. 6 is a block diagram of a structure of a computing device 600 according to an embodiment of this specification. Components of the computing device 600 include but are not limited to a memory 610 and a processor 620. The processor 620 is connected to the memory 610 through a bus 630, and a database 650 is configured to store data.

The computing device 600 further includes an access device 640. The access device 640 enables the computing device 600 to perform communication by using one or more networks 660. Examples of these networks include a public switched telephone network (PSTN), a local area network (LAN), a wide area network (WAN), a private area network (PAN), or a combination of communication networks such as the Internet. The access device 640 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this specification, the foregoing components of the computing device 600 and other components not shown in FIG. 6 may be connected to each other, for example, through a bus. It should be understood that, the block diagram of the structure of the computing device shown in FIG. 6 is merely used as an example instead of a limitation on the scope of this specification. A person skilled in the art can add or replace other components based on a requirement.

The computing device 600 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device such as a desktop computer or a PC. The computing device 600 may alternatively be a mobile or stationary server device.

The processor 620 is configured to implement the steps of the access detection method when executing the computer instructions.

The foregoing describes a schematic solution of the computing device in this embodiment. It should be noted that the technical solution of the computing device and the technical solution of the foregoing access detection method belong to a same concept. For detailed content not described in detail in the technical solution of the computing device, refer to the descriptions of the technical solution of the foregoing access detection method.

An embodiment of this application further provides a computer-readable storage medium. The computer-readable storage medium stores computer instructions, and when the computer instructions are executed by a processor, the steps of the foregoing access detection method are implemented.

The foregoing describes a schematic solution of the computer-readable storage medium in this embodiment. It should be noted that the technical solution of the storage medium and the technical solution of the foregoing access detection method belong to a same concept. For detailed content not described in detail in the technical solution of the storage medium, refer to the descriptions of the technical solution of the foregoing access detection method.

An embodiment of this application further provides a computer program, and when the computer program is executed in a computer, the computer is enabled to perform the steps of the foregoing access detection method.

The foregoing describes a schematic solution of the computer program in this embodiment. It should be noted that the technical solution of the computer program and the technical solution of the foregoing access detection method belong to a same concept. For detailed content not described in detail in the technical solution of the computer program, refer to the descriptions of the technical solution of the foregoing access detection method.

The foregoing describes specific embodiments of this application. Other embodiments fall within the scope of the appended claims. In some cases, actions or steps recorded in the claims may be performed in an order different from that in the embodiments and desired results may still be achieved. In addition, processes depicted in the accompanying drawings do not necessarily require a specific order or a sequential order shown to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include: any entity or apparatus that can carry the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunication signal.

It should be noted that, for ease of description, the foregoing method embodiments are described as a combination of a series of actions. However, a person skilled in the art should understand that this application is not limited to the described action order, because according to this application, some steps may be performed in another order or simultaneously. In addition, a person skilled in the art should also be aware that the embodiments described in this specification are all preferred embodiments, and used actions and means are not necessarily mandatory to this application.

In the foregoing embodiments, the descriptions of the embodiments have respective focuses. For a part that is not described in detail in an embodiment, refer to related descriptions in other embodiments.

The preferred embodiments of this application disclosed above are merely intended to help describe this application. In the optional embodiments, not all details are described in detail, and this application is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method of detecting and controlling abnormal online content access, the method implemented by a computing device and the method comprising:

obtaining, by the computing device, user attribution information of a target object in a predetermined duration of time from network-based user activity data, wherein the user activity data includes machine-generated telemetry comprising freezing reports generated by client devices during content access;

storing the user attribution information in a memory accessible to the computing device;

processing the user attribution information by the computing device to determine attribution types;

determining a distribution of users accessing the target object in the predetermined duration of time based on the attribution types and the user attribution information;

determining a distribution of users with freezing reporting about the target object in the predetermined duration of time based on the attribution types and the user attribution information;

calculating, by the computing device, a distribution of freezing rates in the predetermined duration of time based on the distribution of users accessing the target object and the distribution of users with freezing reporting about the target object;

determining, by the computing device based on the distribution of freezing rates, whether abnormal access indicative of fraudulent activity exists; and in response to determining that the abnormal access indicative of fraudulent activity exists, automatically initiating a system-level action to manage abnormal access conditions.

2. The method according to claim 1, further comprising:

determining time periods in the predetermined duration of time;

determining a quantity of users accessing the target object in each of the attribution types during each of the time periods based on the user attribution information;

determining a quantity of users with freezing reporting about the target object in each of the attribution types during each of the time periods based on the user attribution information;

determining the distribution of users accessing the target object in the predetermined duration of time based on the quantity of users accessing the target object in each of the attribution types during each of the time periods; and determining the distribution of users with freezing reporting about the target object in the predetermined duration of time based on the quantity of users with freezing reporting in each of the attribution types during each of the time periods.

3. The method according to claim 2, wherein the calculating a distribution of freezing rates in the predetermined duration of time based on the distribution of users accessing the target object and the distribution of users with freezing reporting about the target object comprises:

calculating a freezing rate corresponding to each of the attribution types in each of the time periods based on the quantity of users accessing the target object and the quantity of users with freezing reporting in each of the attribution types during each of the time periods; and calculating the distribution of freezing rates in the predetermined duration of time based on the freezing rate corresponding to each of the attribution types in each of the time periods.

4. The method according to claim 3, wherein the determining a detection result of the target object based on the distribution of freezing rates comprises:

calculating an average value of freezing rates and a standard deviation of freezing rates that correspond to each of the attribution types based on the freezing rate corresponding to each of the attribution types in each of the time periods;

selecting abnormal freezing rates from the freezing rates corresponding to each of the attribution types in the predetermined duration of time based on the average value of the freezing rates and the standard deviation of the freezing rates that correspond to each of the attribution types; and determining the detection result of accessing the target object based on a total quantity of the freezing rates corresponding to each of the attribution types and a quantity of the abnormal freezing rates corresponding to each of the attribution types.

5. The method according to claim 4, wherein the selecting abnormal freezing rates from the freezing rates corresponding to each of the attribution types in the predetermined duration of time based on the average value of the freezing rates and the standard deviation of the freezing rates that correspond to each of the attribution types comprises:

calculating an abnormality detection interval corresponding to each of the attribution types based on the average value of the freezing rates and the standard deviation of the freezing rates that correspond to each of the attribution types; and selecting, from the freezing rates corresponding to each of the attribution types in the predetermined duration of time, freezing rates that are not in the abnormality detection interval corresponding to each of the attribution types as the abnormal freezing rates corresponding to each of the attribution types.

6. The method according to claim 4, wherein the determining the detection result of accessing the target object based on a total quantity of the freezing rates corresponding to each of the attribution types and a quantity of the abnormal freezing rates corresponding to each of the attribution types comprises:

calculating a ratio of the quantities of the abnormal freezing rates corresponding to each of the attribution types to the total quantity of the freezing rates corresponding to each of the attribution types;

determining whether the ratio corresponding to each of the attribute types is greater than a preset ratio threshold; and in response to determining that the ratio is greater than the preset ratio threshold, determining that the detection result of the target object comprises abnormal access.

7. The method according to any one of claim 4, wherein before the calculating an average value of freezing rates and a standard deviation of freezing rates that correspond to each of the attribution types based on the freezing rate corresponding to each of the attribution types in each of the time periods, the method further comprises:

determining a first freezing rate quantity that is a quantity of the freezing rates corresponding to each of the attribution types in the predetermined duration of time;

determining a second freezing rate quantity based on the first freezing rate quantity and a preset quantity proportion;

ranking the freezing rates corresponding to each of the attribution types in the predetermined duration of time to obtain a ranking result; and updating the freezing rates corresponding to each of attribution types by removing the second quantity of freezing rates based on the ranking result.

8. The method according to claim 1, wherein before obtaining the user attribution information of a target object in a predetermined duration of time, the method further comprises:

receiving user information of users associated with the target object; and determining the user attribution information of the target object based on the user information.

9. The method according to claim 8, wherein the determining the user attribution information of the target object based on the user information comprises:

parsing the user information to obtain address identifiers; and querying location information and network information that correspond to the address identifiers and identifying the location information and the network information as the user attribution information of the target object, or querying the location information corresponding to the address identifiers and identifying the location information as the user attribution information of the target object.

10. The method according to claim 8, wherein the receiving user information of users associated with the target object comprises:

receiving access user information and freezing user information of the users associated with the target object, wherein the access user information comprises information about the users of accessing the target object, and the freezing user information comprises information about the users with freezing reporting about the target object;

determining access user attribution information of the target object based on the access user information, and determining freezing user attribution information of the target object based on the freezing user information; and identifying the access user attribution information and the freezing user attribution information as the user attribution information.

11. The method according to claim 10, wherein before determining the attribution types of the user attribution information, the method further comprises:

determining whether an information quantity of the access user attribution information in the predetermined duration of time is greater than a preset quantity threshold; and in response to determining that the information quantity of access user attribution information in the predetermined duration of time is greater than the preset quantity threshold, performing operations of determining the attribution types of the user attribution information and determining the distribution of users accessing the target object and the distribution of users with freezing reporting about the target object in the predetermined duration of time based on the attribution types and the user attribution information.

12. A computing device, comprising a memory, a processor, and computer instructions stored in the memory and executable by the processor, wherein when the computer instructions, when executed by the processor, cause the processor to implement operations comprising:

obtaining user attribution information of a target object in a predetermined duration of time from network-based user activity data, wherein the user activity data includes machine-generated telemetry comprising freezing reports generated by client devices during content access;

processing the user attribution information to determine attribution types;

determining a distribution of users accessing the target object in the predetermined duration of time based on the attribution types and the user attribution information;

determining a distribution of users with freezing reporting about the target object in the predetermined duration of time based on the attribution types and the user attribution information;

calculating a distribution of freezing rates in the predetermined duration of time based on the distribution of users accessing the target object and the distribution of users with freezing reporting about the target object;

determining based on the distribution of freezing rates, whether abnormal access indicative of fraudulent activity exists; and automatically initiating a system-level action to manage abnormal access conditions in response to determining that the abnormal access indicative of fraudulent activity exists.

13. The computing device according to claim 12, the operations further comprising:

determining time periods in the predetermined duration of time;

determining a quantity of users accessing the target object in each of the attribution types during each of the time periods based on the user attribution information;

determining a quantity of users with freezing reporting about the target object in each of the attribution types during each of the time periods based on the user attribution information;

determining the distribution of users accessing the target object in the predetermined duration of time based on the quantity of users accessing the target object in each of the attribution types during each of the time periods; and determining the distribution of users with freezing reporting about the target object in the predetermined duration of time based on the quantity of users with freezing reporting in each of the attribution types during each of the time periods.

14. The computing device according to claim 13, the operations further comprising:

calculating a freezing rate corresponding to each of the attribution types in each of the time periods based on the quantity of users accessing the target object and the quantity of users with freezing reporting in each of the attribution types during each of the time periods; and calculating the distribution of freezing rates in the predetermined duration of time based on the freezing rate corresponding to each of the attribution types in each of the time periods.

15. The computing device according to claim 14, the operations further comprising:

calculating an average value of freezing rates and a standard deviation of freezing rates that correspond to each of the attribution types based on the freezing rate corresponding to each of the attribution types in each of the time periods;

selecting abnormal freezing rates from the freezing rates corresponding to each of the attribution types in the predetermined duration of time based on the average value of the freezing rates and the standard deviation of the freezing rates that correspond to each of the attribution types; and determining the detection result of accessing the target object based on a total quantity of the freezing rates corresponding to each of the attribution types and a quantity of the abnormal freezing rates corresponding to each of the attribution types.

16. The computing device according to claim 12, wherein before obtaining the user attribution information of a target object in a predetermined duration of time, the operations further comprise:

receiving user information of users associated with the target object; and determining the user attribution information of the target object based on the user information.

17. The computing device according to claim 16, wherein the determining the user attribution information of the target object based on the user information comprises:

parsing the user information to obtain address identifiers; and querying location information and network information that correspond to the address identifiers and identifying the location information and the network information as the user attribution information of the target object, or querying the location information corresponding to the address identifiers and identifying the location information as the user attribution information of the target object.

18. A non-transitory computer-readable storage medium, wherein the computer-readable storage medium stores computer instructions, and wherein the computer instructions, when executed by a processor, cause the processor to implement operations comprising:

obtaining user attribution information of a target object in a predetermined duration of time from network-based user activity data, the user activity data including machine-generated telemetry comprising freezing reports generated by client devices during content access;

processing the user attribution information to determine attribution types;

determining a distribution of users accessing the target object in the predetermined duration of time based on the attribution types and the user attribution information;

determining a distribution of users with freezing reporting about the target object in the predetermined duration of time based on the attribution types and the user attribution information;

calculating a distribution of freezing rates in the predetermined duration of time based on the distribution of users accessing the target object and the distribution of users with freezing reporting about the target object; and determining based on the distribution of freezing rates, whether abnormal access indicative of fraudulent activity exists; and automatically initiating a system-level action to manage abnormal access conditions in response to determining that the abnormal access indicative of fraudulent activity exists.

19. The non-transitory computer-readable storage medium according to claim 18, the operations further comprising:

determining time periods in the predetermined duration of time;

determining a quantity of users accessing the target object in each of the attribution types during each of the time periods based on the user attribution information;

determining a quantity of users with freezing reporting about the target object in each of the attribution types during each of the time periods based on the user attribution information;

determining the distribution of users accessing the target object in the predetermined duration of time based on the quantity of users accessing the target object in each of the attribution types during each of the time periods; and determining the distribution of users with freezing reporting about the target object in the predetermined duration of time based on the quantity of users with freezing reporting in each of the attribution types during each of the time periods.

20. The non-transitory computer-readable storage medium according to claim 19, the operations further comprising:

calculating a freezing rate corresponding to each of the attribution types in each of the time periods based on the quantity of users accessing the target object and the quantity of users with freezing reporting in each of the attribution types during each of the time periods; and calculating the distribution of freezing rates in the predetermined duration of time based on the freezing rate corresponding to each of the attribution types in each of the time periods.

* * * * *